United States Patent [19]
Ippen et al.

[11] 3,978,429
[45] Aug. 31, 1976

[54] MODE-LOCKED LASER

[75] Inventors: Erich Peter Ippen, Red Bank; Charles Vernon Shank, Holmdel, both of N.J.

[73] Assignee: Bell Telephone Laboratories, Incorporated, Murray Hill, N.J.

[22] Filed: May 27, 1975

[21] Appl. No.: 580,549

[52] U.S. Cl. .......................................... 331/94.5 M
[51] Int. Cl.² ....................................... H01S 3/098
[58] Field of Search ................................... 331/94.5

[56] References Cited
UNITED STATES PATENTS

| | | | |
|---|---|---|---|
| 3,500,241 | 3/1970 | Bjorkholm | 331/94.5 Q |
| 3,638,137 | 1/1972 | Krupke | 331/94.5 Q |

OTHER PUBLICATIONS
Shank et al., Subpicosecond Kilowatt Pulses from a Mode–Locked CW Dye Laser, Appl. Phys. Lett., vol. 24, No. 8 (Apr. 15, 1974) pp. 373–375.

*Primary Examiner*—William L. Sikes
*Attorney, Agent, or Firm*—A. J. Torsiglieri

[57] ABSTRACT

The stability of passively mode-locked lasers operated to provide short pulses is improved by utilizing saturable absorption which has a composite characteristic consisting of one component of relatively fast recovery time and another of relatively slow recovery time. Very short pulses are achieved with a Rhodamine 6G dye laser in combination with a saturable absorber which utilizes a mixture of DODCI and Malachite Green.

12 Claims, 1 Drawing Figure

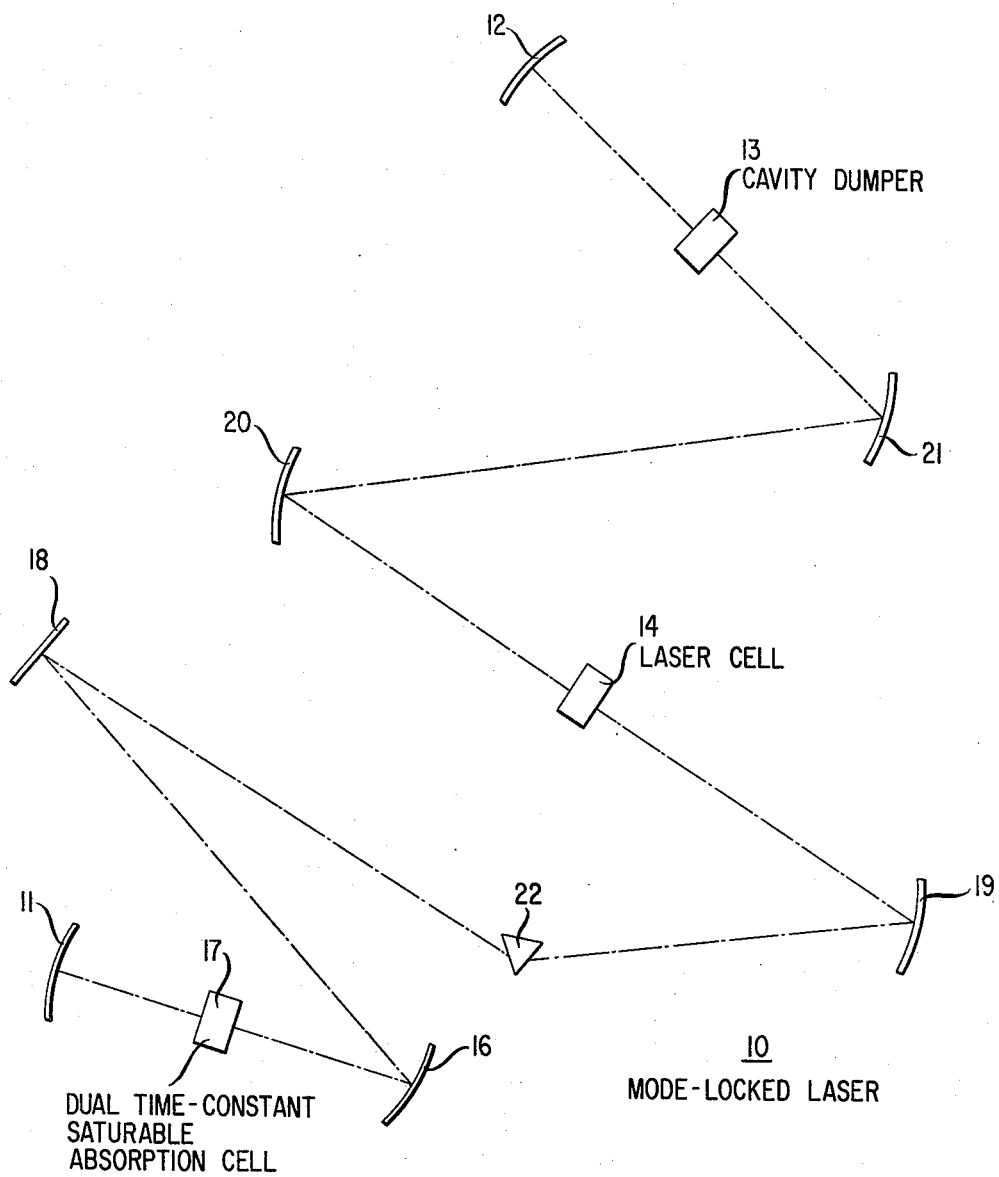

MODE-LOCKED LASER

BACKGROUND OF THE INVENTION

1. Field of the Invention

This relates to lasers and more particularly to passively mode-locked lasers useful as sources of stable short pulses.

2. Description of the Prior Art

As is known, a passively mode-locked laser is a free-running laser which produces a periodic series of pulses whose repetition rate is related to the time it takes a pulse to make a round trip between the two ends of the laser cavity. To produce mode locking passively, a saturable absorber is also included wihin the resonant cavity. A particular form of passively mode-locked laser, pupular because it can be tuned to provide a desired wavelength over a relatively broad band of wavelengths, utilizes an optically pumped "dye" cell as the emitting element and a dye medium as the saturable absorber. An example of a mode-locked laser of this kind is described in our paper published in *Applied Physics Letters* Vol. 24 No. 8, 15 Apr. 1974 pps. 373–375 entitled "Subpicosecond Kilowatt Pulses from a Mode-Locked Dye Laser".

This laser is of particular interest since it is capable of providing pulses of very short duration, such as a picosecond or less.

However, in such lasers, to achieve short pulses it has been found necessary to operate near the threshold of laser operation and, because of the near-threshold condition, to stabilize all parameters, such as mirror positions and pumping power, to a high degree. These requirements prove difficult to maintain in practice and as a result, when the laser is operated to provide very short pulses such as picosecond pulses, the length of the pulses tends to be unstable.

Accordingly, the invention is directed at improving the stability of passively mode-locked lasers, particularly such lasers designed to provide very short pulses.

SUMMARY OF THE INVENTION

To this end, we have discovered that the stability of a laser of the kind which uses a saturable absorber in the cavity to provide mode locking can be improved by utilizing, to provide the desired saturable absorption, a composite absorber which includes as one component an absorber having a fast recovery time and as another component an absorber having a slow recovery time. The recovery time is the time it takes the medium to return to its absorbing state after being bleached by a sharp pulse of light. When the saturable absorber is a dye mixture as in the aforementioned laser, the desired composite absorber may comprise a cell which includes a mixture of two dyes, one having the desired fast recovery, the other the desired slow recovery.

Advantageously, our invention enables sub-picosecond pulsing at a pumping level far above threshold and with excellent stability and reproducibility from run to run and from one laser to another intended to have the same design.

In an illustrative embodiment of the embodiment which has been used to provide 6150 Angstrom pulses of stable length as short as 0.3 picosecond, the emitting element was a dye cell comprising Rhodamine 6G and the saturable absorption was provided by a mixture of DODCI and Malachite Green dissolved in ethylene glycol.

It is one feature of our invention that the ratio of recovery times of the saturable absorbers is in the range from about 10:1 to about 1000:1 or more and preferably in the range from about 100:1 to about 1000:1.

DESCRIPTION OF THE DRAWING

The invention will be described in more detail with reference to the accompanying drawing which illustrates an exemplary passively mode-locked dye laser in accordance with one embodiment of the invention.

DETAILED DESCRIPTION

With reference now to the drawing, there is shown a mode-locked laser 10 which has provided pulses of 6150 Angstroms wavelength adjustable to between 0.3 and 1.0 picoseconds length at a repetition rate of $50 \times 10^3$ pulses per second.

The laser comprises a pair of spaced multilayer dielectric mirrors 11 and 12 which serve as the reflective ends of the laser cavity or resonator. Both mirrors are highly reflective at the wavelength of interest and output power is removed not by passage through either mirror but rather by being "dumped out" in the manner described in our aforementioned paper. To this end, there is shown the "dumper" 13 as representative of the mechanism used to remove power by this technique. As described in detail in that paper, the "dumper" includes an acousto-optic cell in the form of a quartz block to which is connected a source of electrical pulses to control the deflection of light from the resonator for utilization outside the resonator. This technique of deflecting out of the resonator only selected and relatively widely spaced pulses permits the buildup of power within the resonator to make possible high power output pulses at the expense of a reduced repetition rate of output pulses.

Also included with the laser cavity is the emitting cell or element 14 which houses the active medium, a dye mixture comprising Rhodamine 6G dye in a viscous solvent of high purity ethylene glycol. To achieve coherent emission at 6150 Angstroms, this cell is pumped continuously by an argon laser (not shown), illustratively Spectra Physics Model 170, with 5 watts of power at 5145 Angstroms. The argon laser pumping beam is focused to have a minimum waist diameter of about 15 microns as it passes through cell 14.

Cell 14 advantageously is of the kind described in U.S. Pat. No. 3,766,489 which issued to R. Rosenberg and P. K. Runge on Oct. 16, 1973. Such a cell provides a free-falling flowing stream of liquid, free of constricting sidewalls where the excited light beam traverses the liquid. In this embodiment, at the region of traversal the liquid had a thickness of aobut 0.2 millimeters.

To achieve compactness, the resonator path, of about 142.5 cm. length to provide about 8 nanoseconds round trip travel time, is folded by the provision of auxiliary optical elements. The auxiliary elements include a third curved mirror 16 which together with curved mirror 11 forms an auxiliary section within which is located the saturable absorber 17 in the path of the emitted light beam. This comprises a cell enclosing a mixture of a fast-recovery absorber and a slow-recovery absorber. Advantageously, the mixture moves past the beam as a free-falling flowing stream in the same manner as previously described for the active emitting mixture. The beam is focused to have a diameter of about 10 microns where it intersects the flowing stream.

In accordance with an illustrative embodiment of the invention, the mixture comprises DODCI (3–3'-diethyloxadicarbocyanine iodide) available commercially from Eastman Kodak, and Malachite Green (a triphenylmethane dye) also available commercially from Eastman Kodak, dissolved in high purity ethylene glycol. The concentrations are best adjusted experimentally, although the concentrations are such that the two absorptivities are about equal at 6150 Angstroms. The higher the concentrations of the dyes, the higher the threshold power needed for the onset of lasing. Typical values of concentration are about $10^{-4}$ molar DODCI and $4 \times 10^{-5}$ molar Malachite green.

In the past, DODCI used alone was known to be useful as a saturable absorber for use in a mode-locked Rhodamine 6G laser. Such use is described in our aforementioned paper. It is a relatively slow saturable absorber having a recovery time in the solvent ethylene glycol of about 1.2 nanoseconds. It was found that when used alone, it was necessary to operate near the threshold level of pumping to achieve picosecond pulses. Higher pumping levels resulted in longer pulses. However, in this near-threshold region of operation, the laser was particularly sensitive to pumping power level fluctuations and any mechanical movement. Accordingly, reliable operation required extreme care to stabilize all parameters, a factor which reduced the practical utility of the apparatus.

The addition of Malachite Green has been found to permit picosecond pulse operation even at pumping levels well above threshold where pulse length stability is more easily achieved. Malachite Green in ethylene glycol was found to have a comparatively fast recovery time of about 6 picoseconds to the emitted light. Moreover, this value reduces still further to about 2 picoseconds when it is dissolved in methanol. These recovery times are so fast that Malachite Green used alone as the saturable absorber appears not to produce stable mode locking. Moreover, it appears that even in the mixture each component maintains its normal recovery time and that neither affects the recovery time of the other.

The DODCI has a recovery time which is long compared to the length of the pulse sought, although shorter than the round trip through the laser resonator. It is easily saturated by long pulses and appears to induce stable mode-locking behavior in the early stages of laser buildup and to participate in the dynamic process of pulse shortening. The Malachite Green with recovery time of the same order of magnitude of the duration of the short pulses sought is easily saturated only by the shorter, more intense pulses and thus favors short pulse opeation as opposed to long pulse operation.

In particular, it is thought to be advantageous to have a factor of at least ten to one, and preferably between one hundred to one and one thousand to one, in the ratios of the recovery times of the two components providing the saturable absorption.

Other auxiliary optical elements serving to fold the extended path of the laser resonator, as shown, include plane mirror 18, curved mirror 19, curved mirror 20, and curved mirror 21. Moreover, prism 22 is included and made adjustable to provide fine tuning of the output wavelength in a well-known manner. Advantageously, astigmatic effects are made to counteract one another by properly relating the various parameters of the system in accordance with the equation for stability, as described in U.S. Pat. No. 3,731,224 which issued on May 1, 1973 to A. Dienes, E. P. Ippen, H. W. Kogelnik, and C. V. Shank.

For improved efficiency, advantageously the various mirrors are designed to cooperate in a fashion to focus the beam to a waist of reduced cross section at the regions where the beam traverses each of dumper cell 13, active cell 14, and saturable absorber cell 17.

To achieve higher peak powers and shorter pulses, pulse compression can be employed. This involves permitting a degree of frequency sweeping within each pulse and subsequent compression with a grating pair. Additional spectral filtering may be employed to eliminate frequency components that are not sufficiently compressed. The frequency sweeping has been achieved merely by adjusting empirically the various elements within the laser resonator, and the filtering and compression are done externally. By this expedient, pulses originally of 1.0 picosecond duration have been compressed to 0.3 picosecond duration.

It is to be understood that the specific embodiment described in detail is merely illustrative of the general principles of the invention and that various alternatives are possible consistent with these principles. In particular, various other active emitting media should be feasible including other kinds of dye lasers, solid state lasers, and gas lasers of the kind known to be useful for mode-locked operation. Similarly, various other saturable absorption media should be feasible so long as they satisfy the requirements of the two different recovery characteristics as discussed. Moreover, in some instances it may prove advantageous, as for example, when solid state or gas saturable absorbers are employed to use a pair of discrete cells, one with a short recovery time and the other with a fast recovery time, instead of a single cell of composite characteristics as in the embodiment described specifically.

Alternatively it may be feasible to integrate one or both of the absorbers in the same cell as the active emitting medium as was done in our aforementioned paper where the DODCI was combined with Rhodamine 6G in one cell which served both as the emitter and as the absorber. Moreover, various means other than a prism may be utilized to provide frequency tuning and mode selectivity. Additionally, various other techniques may be employed for abstracting output power including use of a partially transmissive end reflector for the laser resonator.

What is claimed is:

1. A source of coherent light pulses comprising a pair of reflective end members defining therebetween an optical resonant cavity, means for emitting coherent light within said cavity, and means for providing saturable absorption of the emitted light within said cavity, said means comprising first and second different absorption means, the recovery time of said first means being at least ten times faster than that of said second means, both recovery times being shorter than the round trip time of emitted light between the two reflective end members.

2. A source in accordance with claim 1 in which the emitting means includes a dye cell and the first and second absorption means are different dyes.

3. A source in accordance with claim 1 in which the emitting means includes a Rhodamine 6G dye cell and the absorption means are DODCI and Malachite Green dyes in a common mixture.

4. A source in accordance with claim 3 further including means for periodically deflecting a part of the emitted light out of said optical cavity for utilization.

5. A source in accordance with claim 1 further including means for periodically deflecting a part of the emitted light out of said optical cavity for utilization.

6. A source in accordance with claim 1 which includes means for pumping the emitting means for inducing emission.

7. A source in accordance with claim 6 in which the saturable absorption means are adapted for mode-locking the emission.

8. A passively mode-locked laser comprising a pair of reflective end members defining therebetween an optical cavity, a first dye cell located within said cavity for emitting light for reflection between said end members and a second dye cell located within said cavity and including a pair of different dyes, of which one has a recovery time at least ten times faster than the other, each having a recovery time shorter than the round trip time of the emitted light between the two end members, whereby the emitted light is mode locked to provide a series of pulses.

9. A laser in accordance with claim 8 in which there is included within the optical cavity means for deflecting selected pulses out of said cavity for utilization.

10. A laser in accordance with claim 8 in which the second dye cell is adapted for mode-locking the light emitted from the first dye cell.

11. A laser in accordance with claim 8 in which the first dye cell incudes Rhodamine 6G and the second dye cell includes DODCI and Malachite Green.

12. A laser in accordance with claim 8 which includes means for pumping the first dye cell with coherent wave energy for inducing emission.

* * * * *